(12) United States Patent
Matoba

(10) Patent No.: US 11,625,212 B2
(45) Date of Patent: Apr. 11, 2023

(54) SCREEN CREATION ASSISTANCE DEVICE, DISPLAY DEVICE, AND COMPUTER READABLE STORAGE MEDIUM

(71) Applicant: Mitsubishi Electric Corporation, Tokyo (JP)

(72) Inventor: Yuya Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/299,305

(22) PCT Filed: Jan. 31, 2019

(86) PCT No.: PCT/JP2019/003394
§ 371 (c)(1),
(2) Date: Jun. 3, 2021

(87) PCT Pub. No.: WO2020/157918
PCT Pub. Date: Aug. 6, 2020

(65) Prior Publication Data
US 2022/0043620 A1    Feb. 10, 2022

(51) Int. Cl.
*G06F 3/147* (2006.01)
*G06F 8/36* (2018.01)
*H04B 1/38* (2015.01)

(52) U.S. Cl.
CPC .............. *G06F 3/147* (2013.01); *G06F 8/36* (2013.01); *H04B 1/38* (2013.01)

(58) Field of Classification Search
CPC ..................................................... G06F 3/147
See application file for complete search history.

(56) References Cited

U.S. PATENT DOCUMENTS

| | | | |
|---|---|---|---|
| 10,373,211 B1 * | 8/2019 | Ghoshal et al. | ... G06Q 30/0276 |
| 2002/0183870 A1 * | 12/2002 | Misawa et al. | ........ G05B 19/18 |
| 2012/0319944 A1 | 12/2012 | Koara | |
| 2013/0135331 A1 * | 5/2013 | Koara | ..................... G09G 5/00 |

(Continued)

FOREIGN PATENT DOCUMENTS

| | | |
|---|---|---|
| JP | 4-360246 A | 12/1992 |
| JP | 8-263244 A | 10/1996 |

(Continued)

OTHER PUBLICATIONS

International Search Report and Written Opinion dated Apr. 23, 2019, received for PCT Application PCT/JP2019/003394, Filed on Jan. 31, 2019, 10 pages including English Translation.

(Continued)

*Primary Examiner* — James J Debrow
(74) *Attorney, Agent, or Firm* — Xsensus LLP

(57) ABSTRACT

A screen creation assistance device includes: a master data creation unit that creates master data including specific information that is information that specifies each of elements included in screen creation data for causing a display device to display a screen; a sub-project data creation unit that creates sub-project data including reference data for referring to the master data, and the specific information on elements that are not included in the master data; and a communication unit that transmits the master data and the sub-project data to a display device.

18 Claims, 15 Drawing Sheets

(56) References Cited

U.S. PATENT DOCUMENTS

| 2016/0334776 | A1* | 11/2016 | Hanaki et al. | G05B 19/05 |
| 2017/0364223 | A1* | 12/2017 | Ishikuro | G06F 3/0484 |
| 2018/0255148 | A1* | 9/2018 | Kondo | H04L 29/08 |
| 2019/0286462 | A1* | 9/2019 | Bodnick et al. | G06F 9/453 |
| 2021/0043168 | A1* | 2/2021 | Kobari | G09G 5/363 |

FOREIGN PATENT DOCUMENTS

| JP | 2000-276339 | A | 10/2000 |
| JP | 2000-330769 | A | 11/2000 |
| JP | 2002-351510 | A | 12/2002 |
| JP | 2004-252742 | A | 9/2004 |
| JP | 2006-301729 | A | 11/2006 |
| JP | 5047401 | B1 | 10/2012 |
| JP | 2016-153930 | A | 8/2016 |
| WO | 2011/108026 | A1 | 9/2011 |
| WO | 2013/080332 | A1 | 6/2013 |
| WO | 2014/181422 | A1 | 11/2014 |

OTHER PUBLICATIONS

Decision to Grant dated Jul. 23, 2019, received for JP Application 2019-534911, 5 pages including English Translation.

* cited by examiner

FIG.9
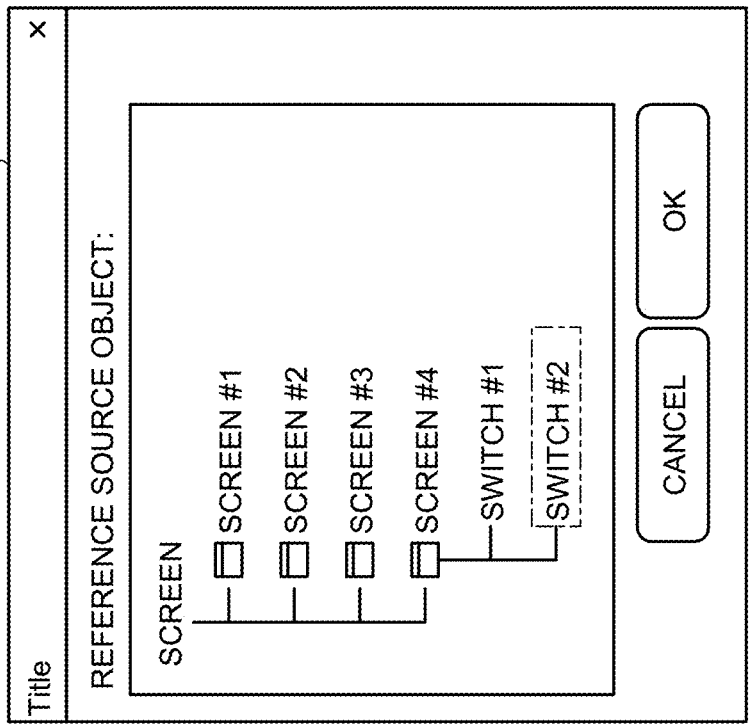
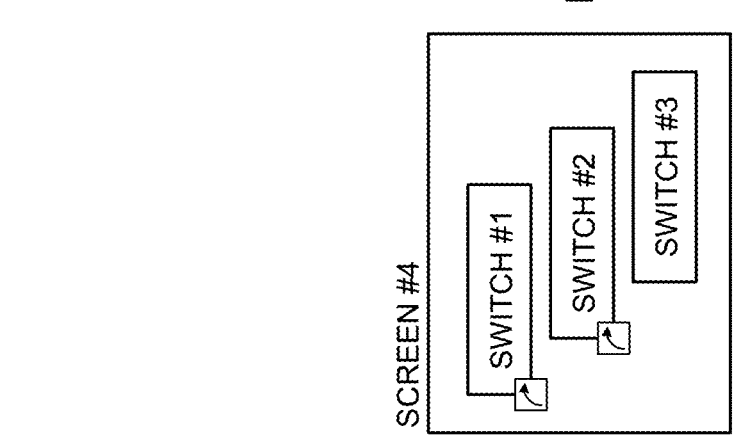
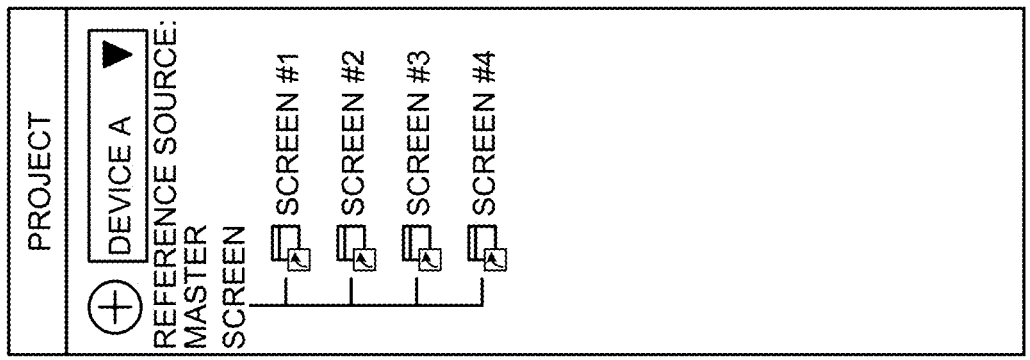

FIG.10

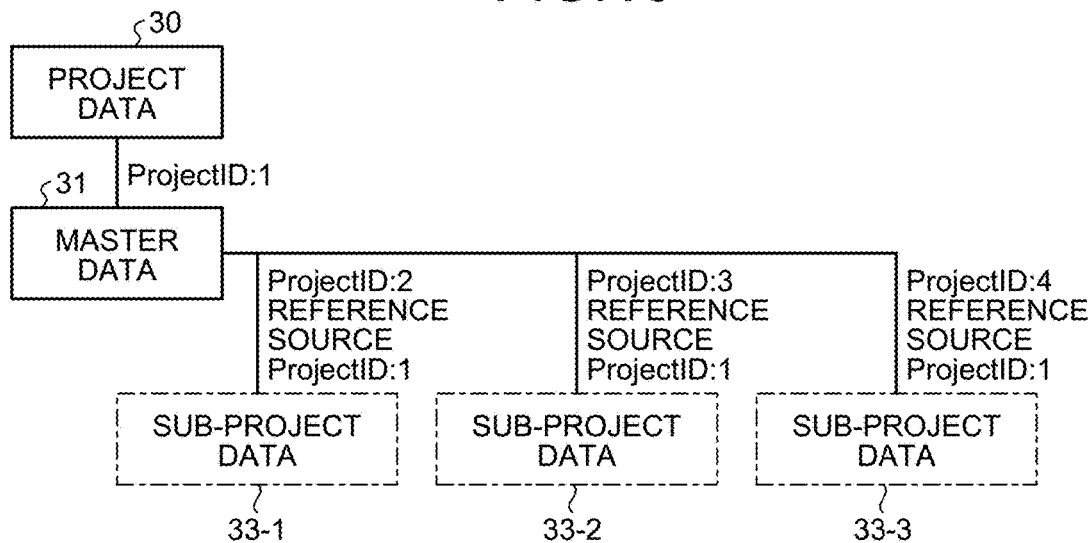

FIG.11

SCREEN #1
ObjectID:1

|  | MASTER DATA 31 | SUB-PROJECT DATA 33-1 | SUB-PROJECT DATA 33-2 | SUB-PROJECT DATA 33-3 |
|---|---|---|---|---|
| DEVICE | D100 | D200 | D200 | D200 |
| FONT | OUTLINE | 16-DOT STANDARD | REFERENCE | REFERENCE |
| CHARACTER STRING | "abc" | "def" | "def" | "ghi" |
| ... | | | | |

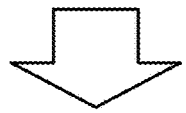 DATA ORGANIZATION

|  | MASTER DATA 31 | SUB-PROJECT DATA 33-1 | SUB-PROJECT DATA 33-2 | SUB-PROJECT DATA 33-3 |
|---|---|---|---|---|
| DEVICE | D200 | REFERENCE | REFERENCE | REFERENCE |
| FONT | OUTLINE | 16-DOT STANDARD | REFERENCE | REFERENCE |
| CHARACTER STRING | "abc" | "def" | "def" | "ghi" |
| ... | | | | |

FIG.13

| SCREEN #1<br>ObjectID:1 | MASTER DATA 31 | SUB-PROJECT DATA 33-1 | SUB-PROJECT DATA 33-2 | DERIVED SUB-PROJECT DATA 33A-1 | DERIVED SUB-PROJECT DATA 33A-2 |
|---|---|---|---|---|---|
| DEVICE | D100 | D200 | D200 | D200 | D200 |
| FONT | OUTLINE | 16-DOT STANDARD | REFERENCE | REFERENCE | REFERENCE |
| CHARACTER STRING | "abc" | "def" | "def" | "ghi" | "ghi" |
| ... | | | | | |

DATA ORGANIZATION

| | MASTER DATA 31 | SUB-PROJECT DATA 33-1 | SUB-PROJECT DATA 33-2 | DERIVED SUB-PROJECT DATA 33A-1 | DERIVED SUB-PROJECT DATA 33A-2 |
|---|---|---|---|---|---|
| DEVICE | D200 | REFERENCE | REFERENCE | REFERENCE | REFERENCE |
| FONT | OUTLINE | 16-DOT STANDARD | REFERENCE | REFERENCE | REFERENCE |
| CHARACTER STRING | "abc" | "def" | "def" | "ghi" | "ghi" |
| ... | | | | | |

SCREEN CREATION ASSISTANCE DEVICE, DISPLAY DEVICE, AND COMPUTER READABLE STORAGE MEDIUM

CROSS-REFERENCE TO RELATED APPLICATION

The present application is based on PCT filing PCT/JP2019/003394, filed Jan. 31, 2019, the entire contents of which are incorporated herein by reference.

FIELD

The present invention relates to a screen creation assistance device, a display device, a screen creation assistance method, and a computer program.

BACKGROUND

A programmable display which is connected to an external device such as a programmable logic controller (PLC) and displays the conditions of the external device is conventionally known. The programmable display displays a screen depending on screen creation data created on the basis of a project file.

A project file disclosed in Patent Literature 1 includes a template and project property data which is the substance of data in order to facilitate data management when diverting the project file. According to the project file disclosed in Patent Literature 1, there is no need to create different project files each time when the project file is diverted, and it is only required to create project property data by using a common template.

CITATION LIST

Patent Literature

Patent Literature 1: WO 2013/080332 A

SUMMARY

Technical Problem

However, the technique disclosed in Patent Literature 1 has a problem in that it takes time and effort when diverting the project data. Specifically, in the technique disclosed in Patent Literature 1, the project property data stores only literals, and when adding a new type of data, it is necessary to add the data to the template and all project property data even if the data is used by only one display device, which takes time and effort.

The present invention has been made in view of the above, and an object thereof is to obtain a screen creation assistance device capable of easily diverting project data for causing a display device to display a screen.

Solution to Problem

A screen creation assistance device according to an aspect of the present invention includes: a master data creation unit to create master data including specific information that is information that specifies each of elements included in screen creation data for causing a display device to display a screen; a sub-project data creation unit to create sub-project data including reference data for referring to the master data, and the specific information on elements that are not included in the master data; and a communication unit to transmit the master data and the sub-project data to a display device.

Advantageous Effects of Invention

The screen creation assistance device according to the present invention achieves an effect that the project data for causing the display device to display a screen can be easily diverted.

BRIEF DESCRIPTION OF DRAWINGS

FIG. 9 is an explanatory diagram of an example of a sub-project data editing process by the screen creation assistance device illustrated in FIG. 3.

FIG. 10 is a diagram illustrating an example of a data structure of the project data created by the screen creation assistance device illustrated in FIG. 3.

FIG. 11 is a diagram illustrating details of the data structure of a part of the project data illustrated in FIG. 10.

FIG. 13 is a diagram illustrating details of the data structure of a part of the project data illustrated in FIG. 12.

DESCRIPTION OF EMBODIMENTS

A screen creation assistance device, a display device, a screen creation assistance method, and a computer program according to an embodiment of the present invention will be described in detail below with reference to the drawings. The present invention is not limited to the embodiment.

First Embodiment

Figure 1:
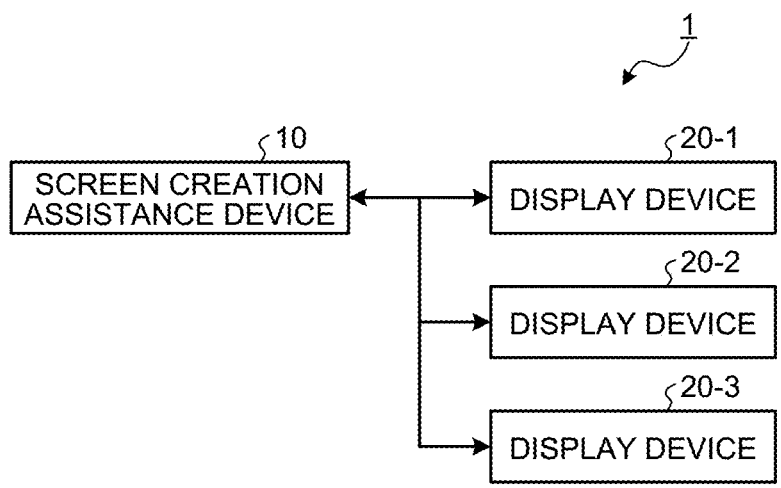
FIG. 1 is a diagram illustrating a configuration of a screen creation assistance system according to a first embodiment of the present invention.

FIG. 1 is a diagram illustrating a configuration of a screen creation assistance system 1 according to a first embodiment of the present invention. The screen creation assistance system 1 includes a screen creation assistance device 10 and a plurality of display devices 20-1 to 20-3. Hereinafter, in a case where it is not necessary to particularly distinguish the plurality of display devices 20-1 to 20-3 from each other, each of the display devices 20-1 to 20-3 is simply referred to as a display device 20.

The screen creation assistance device 10 is connected to each of the plurality of display devices 20-1 to 20-3 via a wired or wireless communication path. The screen creation assistance device 10 creates project data serving as a basis of screen creation data, which is data used to be by the display device 20 for displaying a screen, and transmits the created project data to the display device 20. The screen creation data is created on the basis of the project data, and includes a plurality of elements for the display device 20 to display a display screen. The elements included in the screen creation data include, for example, an element constituting the display screen and an element for displaying a screen such as a destination output of the screen. Furthermore, the screen creation assistance device 10 has a function of acquiring project data stored in the display device 20 and editing the acquired project data.

The display device 20 is connected to an external device such as a PLC (not illustrated) to display the conditions of the external device or the like. The display device 20 is, for example, a programmable display, and displays a screen by using screen creation data based on the project data.

Figure 2:
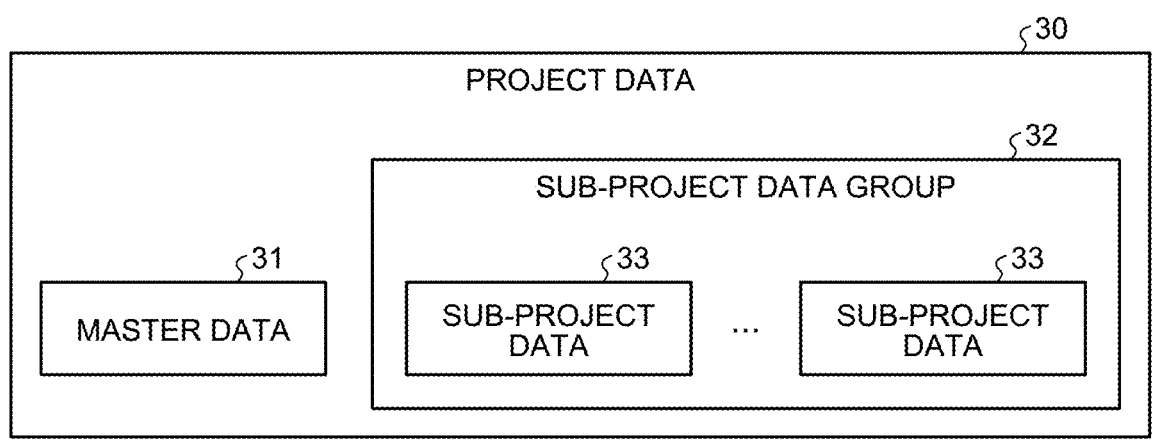
FIG. 2 is a diagram illustrating a configuration of project data created by a screen creation assistance device illustrated in FIG. 1.

FIG. 2 is a diagram illustrating a configuration of project data 30 created by the screen creation assistance device 10 illustrated in FIG. 1. The project data 30 includes master data 31 and a sub-project data group 32. The sub-project data group 32 includes a plurality of sub-project data 33. The master data 31 includes specific information which is information that specifies each of the elements included in the screen creation data. The specific information includes, for example, setting identifiers which are each an identifier for identifying one of the elements included in the screen creation data, and literals which are used by the display device for operation and are values of the elements corresponding to the setting identifiers. The sub-project data 33 includes reference data for referring to the master data 31, setting identifiers which are not included in the master data 31, and literals corresponding to the setting identifiers which are not included in the master data.

Figure 3:
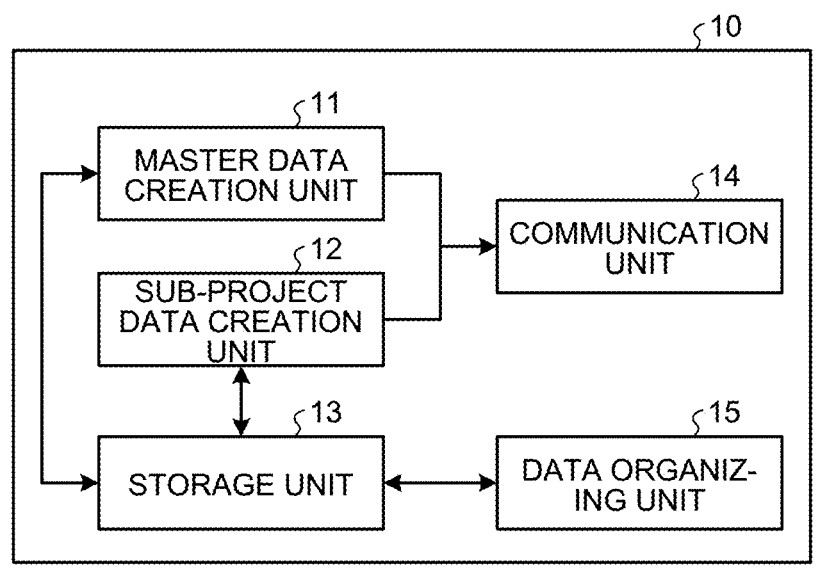
FIG. 3 is a diagram illustrating a functional configuration of the screen creation assistance device illustrated in FIG. 1.

FIG. 3 is a diagram illustrating a functional configuration of the screen creation assistance device 10 illustrated in FIG. 1. The screen creation assistance device 10 includes a master data creation unit 11, a sub-project data creation unit 12, a storage unit 13, a communication unit 14, and a data organizing unit 15.

The master data creation unit 11 creates the master data 31 of the project data 30. The master data creation unit 11 creates the master data 31 which includes elements included in the screen creation data, for example, setting identifiers, and literals corresponding to the setting identifiers, and inputs the created master data to the storage unit 13 and the communication unit 14.

The sub-project data creation unit 12 creates the sub-project data 33 of the project data 30. The sub-project data creation unit 12 creates the sub-project data 33 which includes reference data for referring to the master data 31, elements which are not included in the master data 31, for example, setting identifiers, and literals corresponding to the setting identifiers which are not included in the master data 31, and inputs the created sub-project data 33 to the storage unit 13 and the communication unit 14.

The storage unit 13 stores the project data 30 which includes the master data 31 input from the master data creation unit 11 and the sub-project data 33 input from the sub-project data creation unit 12.

The communication unit 14 has a communication function with the display device 20. The communication unit 14 can transmit, to the display device 20, the master data 31 input from the master data creation unit 11 and the sub-project data 33 input from the sub-project data creation unit 12.

The data organizing unit 15 has a function of organizing data included in the project data 30 so as to simplify a data structure of the project data 30 stored in the storage unit 13 to facilitate data management. The data organizing unit 15 updates the project data 30 stored in the storage unit 13 to reflect the content of editing made by the data organizing unit 15.

Figure 4:
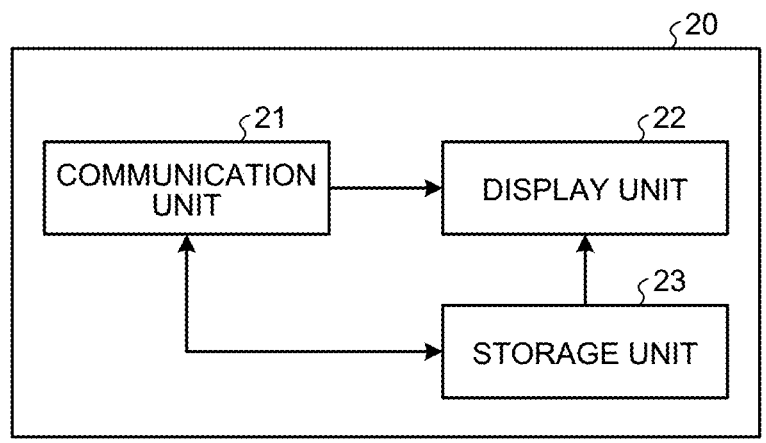
FIG. 4 is a diagram illustrating a functional configuration of a display device illustrated in FIG. 1.

FIG. 4 is a diagram illustrating a functional configuration of the display device 20 illustrated in FIG. 1. The display device 20 includes a communication unit 21, a display unit 22, and a storage unit 23.

The communication unit 21 has a communication function with the screen creation assistance device 10 and another display device 20. The communication unit 21 can perform transmission of the project data 30 between the communication unit 21 and each of the screen creation assistance device 10 and the another display device 20. For example, the communication unit 21 receives the project data 30 from the screen creation assistance device 10 and inputs the received project data 30 to the display unit 22 and the storage unit 23.

The display unit 22 displays a screen by using screen creation data based on the project data 30 received by the communication unit 21. In a case where the received project data 30 includes the sub-project data 33 and does not include the master data 31, the display unit 22 displays a screen by referring to the master data 31 stored in another display device 20.

The storage unit 23 stores the project data 30 received by the communication unit 21. The project data 30 stored in the storage unit 23 may include the master data 31 and the sub-project data 33, or may not include the master data 31 and may include the sub-project data 33. Furthermore, the project data 30 stored in the storage unit 23 may include a plurality of sub-project data 33. In a case where the project data 30 includes the plurality of sub-project data 33, information which designates, among the plurality of sub-project data 33, the sub-project data 33 used by the display device 20 may be added to the project data 30.

Figure 5:
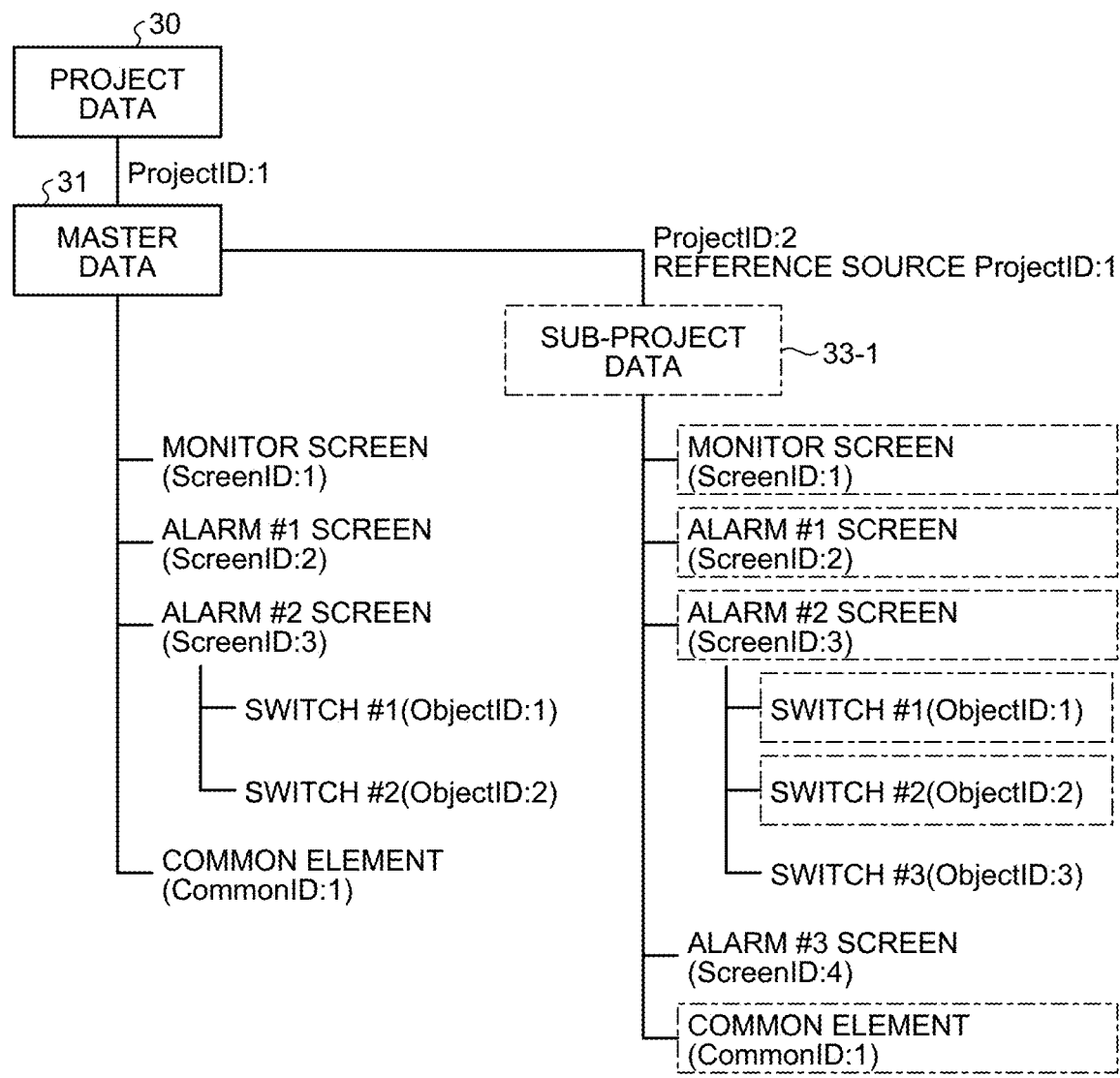
FIG. 5 is a diagram illustrating an example of the project data created by the screen creation assistance device illustrated in FIG. 3.

FIG. 5 is a diagram illustrating an example of the project data 30 created by the screen creation assistance device 10 illustrated in FIG. 3. The project data 30 includes the master data 31 and sub-project data 33-1 which refers to the master data 31.

In the example illustrated in FIG. 5, the master data 31 includes a monitor screen, an alarm #1 screen, an alarm #2 screen, and a common element. The alarm #2 screen includes a switch #1 and a switch #2. Here, each of the monitor screen, the alarm #1 screen, the alarm #2 screen, the common element, the switch #1, and the switch #2 is a label which is any character string added to each of elements included in screen creation data. Furthermore, in the example of FIG. 5, ScreenID, ObjectID, and CommonID are setting identifiers each for identifying one of the elements included in the screen creation data. Although omitted here, for each of the plurality of elements, a literal corresponding thereto is set.

The sub-project data 33-1 refers to the master data 31. A monitor screen, an alarm #1 screen, an alarm #2 screen, and a common element of the sub-project data 33-1 are reference data from the master data 31. That is, the monitor screen, the alarm #1 screen, the alarm #2 screen, and the common element of the sub-project data 33-1 do not have literals, and by referring to the master data 31, the same values as those of the master data 31 are used. The alarm #2 screen of the sub-project data 33-1 includes a switch #3 which is not included in the master data 31. Furthermore, the sub-project data 33-1 includes an alarm #3 screen which is not included in the master data 31. As described above, the sub-project data 33-1 can include setting identifiers which are not included in the master data 31 and the literals corresponding to the setting identifiers which are not included in the master data 31. The common element is an element which is commonly used regardless of screens, and examples thereof include communication settings, and alarm setting values.

Figure 6:
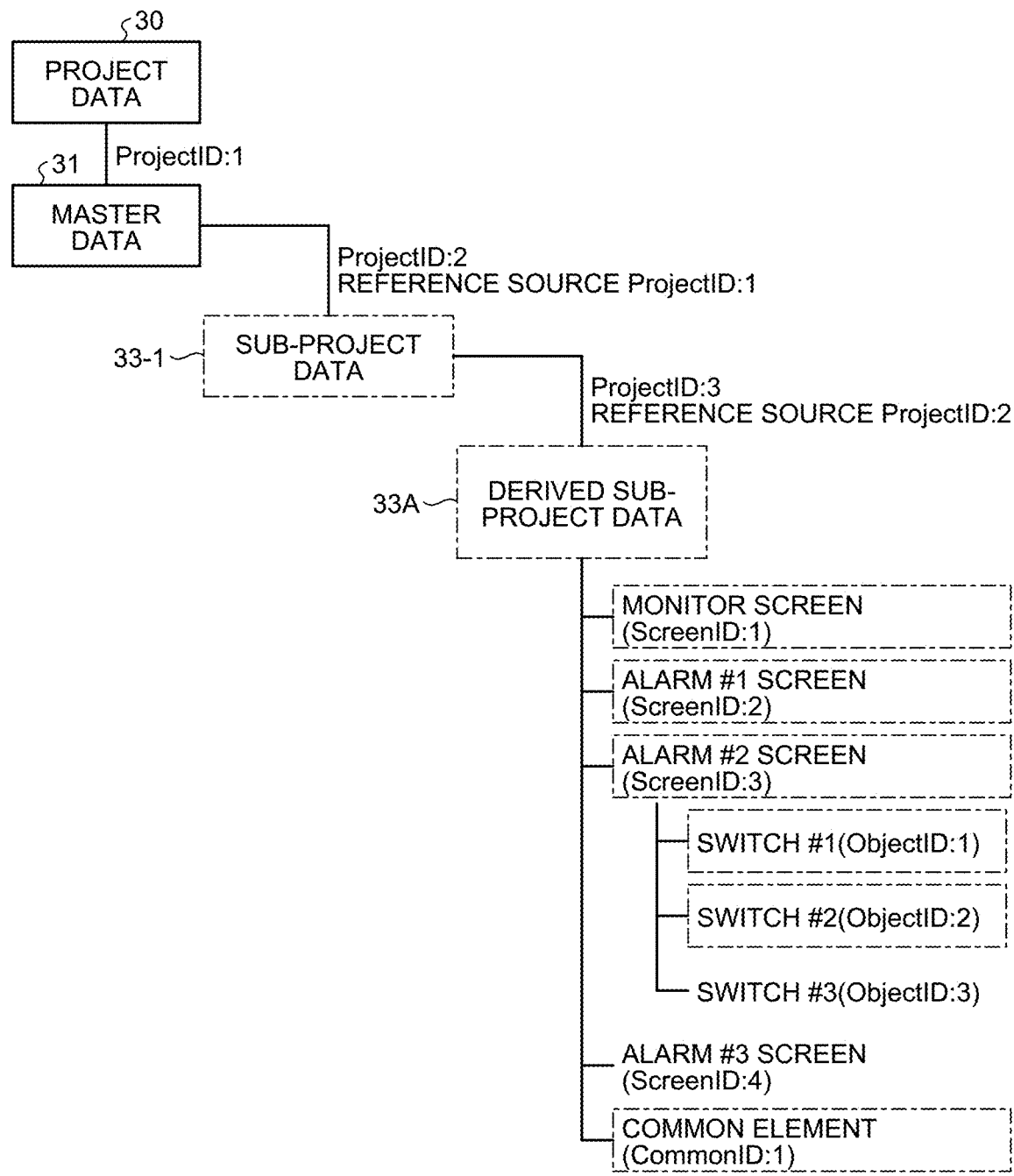
FIG. 6 is a diagram illustrating an example of derived sub-project data created by the screen creation assistance device illustrated in FIG. 3.

FIG. 6 is a diagram illustrating an example of derived sub-project data 33A created by the screen creation assistance device 10 illustrated in FIG. 3. Although omitted in FIG. 6, each of the master data 31 and the sub-project data 33-1 of FIG. 6 includes the plurality of elements illustrated in FIG. 5. The derived sub-project data 33A is the sub-project data 33 which refers to the sub-project data 33-1. The derived sub-project data 33A can include reference data for referring to each element of the sub-project data 33-1 to be referred to, setting identifiers which are not included in the sub-project data 33-1 to be referred to, and the literals corresponding to the setting identifiers which are not included in the sub-project data 33-1 to be referred to.

Figure 7:
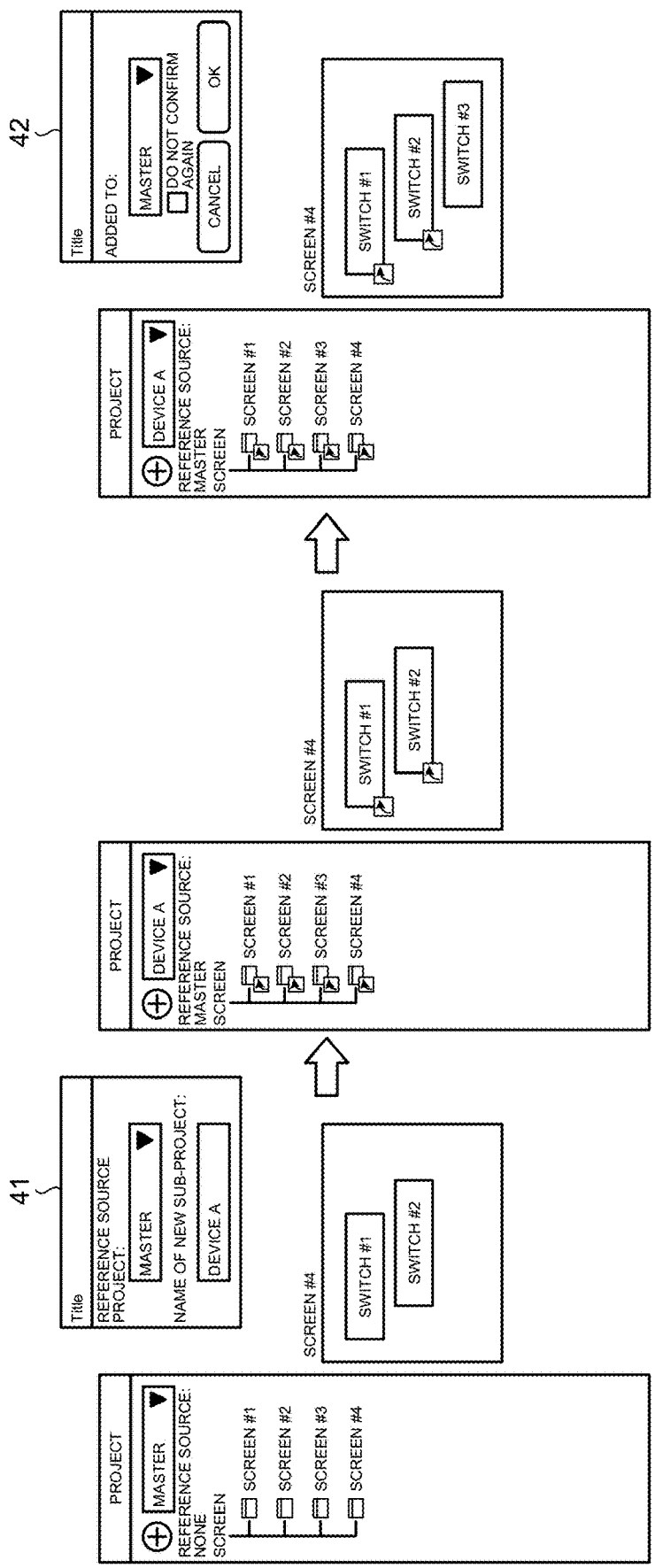
FIG. 7 is an explanatory diagram of a sub-project data creation process by the screen creation assistance device illustrated in FIG. 3.

FIG. 7 is an explanatory diagram of a sub-project data 33 creation process by the screen creation assistance device 10 illustrated in FIG. 3. Here, the master data 31 including the screens #1 to #4 already exists, and the screen #4 includes the switch #1 and the switch #2. When an operation of creating new sub-project data 33 is performed in such a state, the sub-project data creation unit 12 displays a reference source selection screen 41 for selecting a project to be referred to, and receives selection of the project to be referred to. Regarding the project to be referred to, for example, options are displayed in a pull-down format, and in a case where there exists the sub-project data 33 which has been already created, the options include the master data 31 and the sub-project data 33.

If the master data 31 is selected as the project to be referred to, the sub-project data creation unit 12 creates the sub-project data 33 including a plurality of reference data each for referring to one of all the elements included in the master data 31. If specific information which is not included in the master data 31, for example, a literal is input, the sub-project data creation unit 12 causes to which data the literal is saved to be selected from the master data 31 and the sub-project data 33.

Specifically, when a user performs an operation of editing the sub-project data 33, for example, an operation of adding the switch #3 to the screen #4 and sets the literal of the switch #3, the sub-project data creation unit 12 displays a destination-data selection screen 42 for selecting a save-destination data of the literal of the added element. Regarding the save-destination data, for example, options are displayed in a pull-down format, and the options include the master data 31 and the sub-project data 33. Because the sub-project data 33 which refers to the master data 31 is created here, the options are the master data 31 and the sub-project data 33 which is under creation. In a case of creating the derived sub-project data 33A which refers to the sub-project data 33, the options include the sub-project data 33 as a reference source.

In the example illustrated in FIG. 7, the destination-data selection screen 42 is used to select the save-destination data of the content of editing, but there is no need for the sub-project data creation unit 12 to display the destination-data selection screen 42 every time. For example, once the save-destination data is selected, the selected save-destination data may be used in subsequent processes.

In the screen creation assistance device 10, the master data 31 can include setting identifiers and literals, and the sub-project data 33 can include setting identifiers and literals which are not included in the master data 31. While editing the sub-project data 33, the user may wish to reflect the content of editing in all of the project data 30. As described above, the sub-project data creation unit 12 can display the destination-data selection screen 42 for causing the save-destination data of the content of editing to be selected from the master data 31 and the sub-project data 33. Therefore, it is possible to reflect the content of editing in the master data 31 while editing the sub-project data 33 without opening an edit screen for the master data 31.

Figure 8:
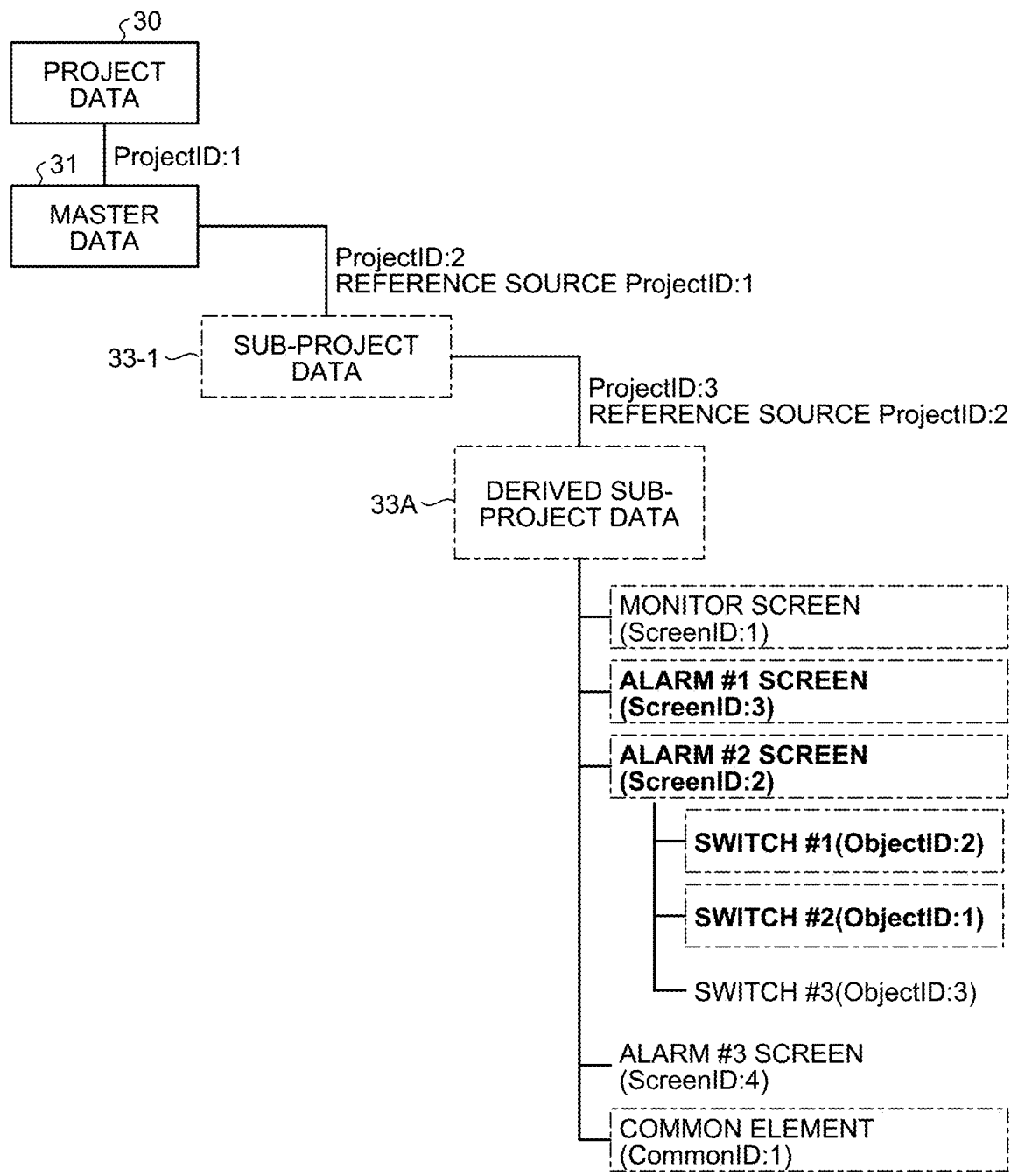
FIG. 8 is a diagram illustrating an example of the project data illustrated in FIG. 6 after editing.

FIG. 8 is a diagram illustrating an example of the project data 30 illustrated in FIG. 6 after editing. In the above, the editing for adding elements which are not included in the reference source data has been mainly described, but the user can also replace elements such as a screen and an object included in the reference source. At that time, the sub-project data creation unit 12 can associate a character string same as a label included in the reference source data such as the master data 31 with a setting identifier different from that of the reference source data. For example, in the example illustrated in FIG. 8, an "alarm #2 screen" of the sub-project data 33-1 is associated with a setting identifier "ScreenID: 3", whereas an "alarm #2 screen" of the derived sub-project data 33A after editing is associated with a setting identifier "ScreenID:2".

FIG. 9 is an explanatory diagram of an example of a sub-project data 33 editing process by the screen creation assistance device 10 illustrated in FIG. 3. When an operation of changing a reference source of an object in the screen is performed, the sub-project data creation unit 12 displays a reference source change screen 43 and receives the operation of changing the reference source of the designated object. In the example illustrated in FIG. 9, the reference source of the switch #1 is changed to the "switch #2" of the master data 31.

Next, a function of the data organizing unit 15 of the screen creation assistance device 10 will be described. The user can freely edit the content of the sub-project data 33 by using the screen creation assistance device 10. The content of editing can be reflected in the master data 31 or can be reflected only in the sub-project data 33 individually. Because these contents of editing are not centrally managed, when considering the entire project data 30, the data structure thereof may become complicated depending on the contents of editing by the user. For example, the literals included in the master data 31 are preferably values used by as many sub-project data 33 as possible. However, the data structure of the project data 30 is not always kept efficient. Therefore, the data organizing unit 15 organizes the data so that the data structure of the project data 30 is simplified as a whole.

FIG. 10 is a diagram illustrating an example of the data structure of the project data 30 created by the screen creation assistance device 10 illustrated in FIG. 3. In addition, FIG. 11 is a diagram illustrating details of the data structure of a part of the project data 30 illustrated in FIG. 10. The project data 30 includes the master data 31 and a plurality of sub-project data 33-1, 33-2, and 33-3 which refer to the master data 31. Each of the master data 31 and the sub-project data 33-1, 33-2, and 33-3 includes data of the screen #1, and the screen #1 includes elements indicated by ObjectID:1.

FIG. 11 illustrates the literals of a plurality of elements of ObjectID:1 of the screen #1. Focusing on the literal of each element before data organization, the literal of "device" is "D100" for the master data 31 and "D200" for the sub-project data 33-1, 33-2, and 33-3. The literal of "font" is "outline" for the master data 31, "16-dot standard" for the sub-project data 33-1, and reference data from the master data 31 for the sub-project data 33-2 and 33-3. The literal of "character string" is "abc" for the master data 31, "def" for the sub-project data 33-1 and 33-2, and "ghi" for the sub-project data 33-3. In this case, because the common literal "D200" is included in "device" of all the sub-project data 33-1, 33-2, and 33-3 which refer to the master data 31, the literal in the master data 31 is preferably "D200" considering the data structure of the entire project data 30. As illustrated in a portion in FIG. 11 regarding after data organization, the data organizing unit 15 replaces the literal in the master data 31 with the common literal "D200", and replaces the literals of "device" of the sub-project data 33-1, 33-2, and 33-3 with reference data.

In the example illustrated in FIG. 11, the literal in the master data 31 is replaced with the literal common to all the sub-project data 33, but it is not necessarily the literal common to all the sub-project data 33. For example, the literal in the master data 31 may be replaced with literal having the highest ratio among the literal in the plurality of sub-project data 33. In this case, in the example of FIG. 11, the literal of "character string" of the master data 31 can be replaced with "def", and "character string" of the sub-project data 33-1 and 33-2 can be replaced with reference data.

Figure 12:
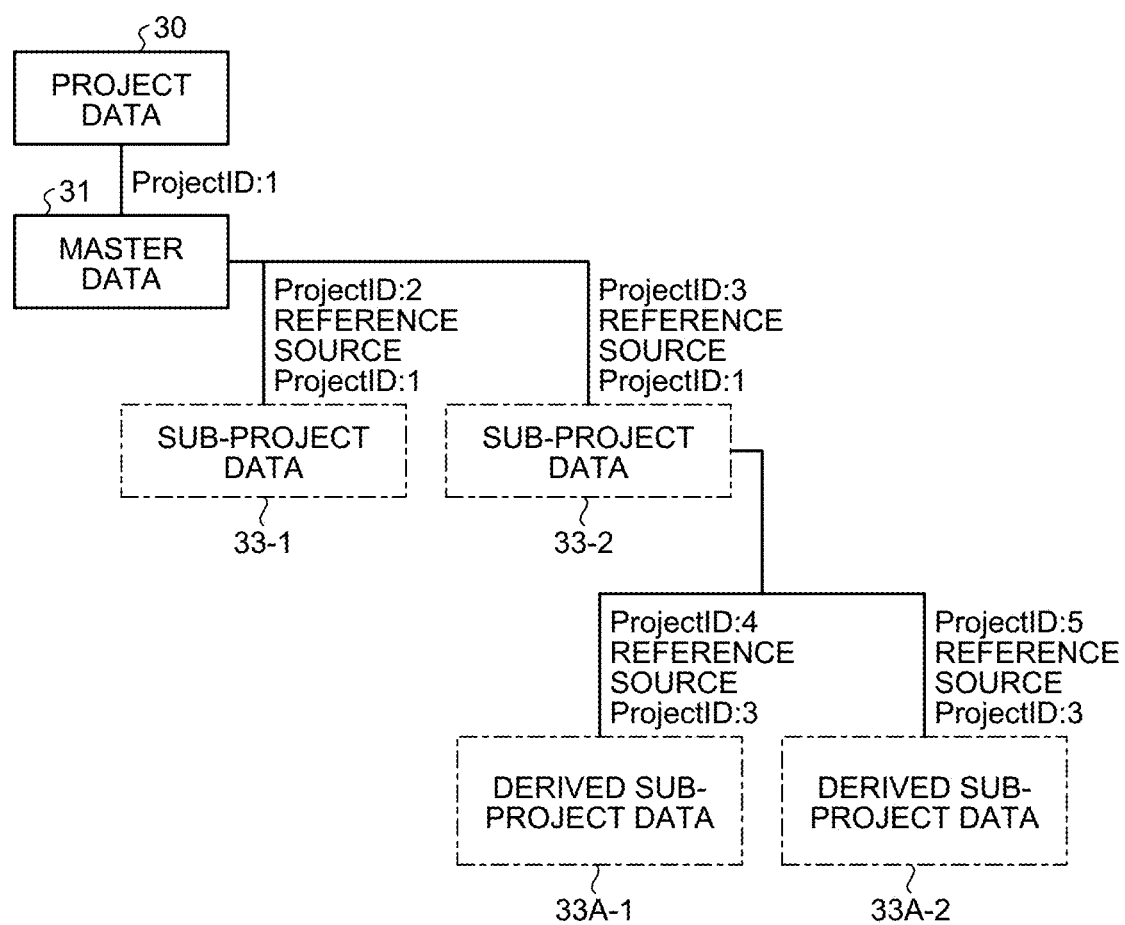
FIG. 12 is a diagram illustrating an example of a data structure of the project data including derived sub-project data created by the screen creation assistance device illustrated in FIG. 3.

Next, an example will be described in which data of the project data 30 including the derived sub-project data 33A are organized. FIG. 12 is a diagram illustrating an example of a data structure of the project data 30 including the derived sub-project data 33A created by the screen creation assistance device 10 illustrated in FIG. 3. In addition, FIG. 13 is a diagram illustrating details of the data structure of a part of the project data 30 illustrated in FIG. 12. The project data 30 includes the master data 31, the plurality of sub-project data 33-1 and 33-2 which refer to the master data 31, and derived sub-project data 33A-1 and 33A-2 which refer to the sub-project data 33-2. Each of the master data 31, the sub-project data 33-1 and 33-2, and the derived sub-project data 33A-1 and 33A-2 includes the data of the screen #1, and the screen #1 includes elements indicated by ObjectID:1.

FIG. 13 illustrates the literals of a plurality of elements of ObjectID:1 of the screen #1. Focusing on the literal of each element before data organization, the literal of "device" is "D100" for the master data 31, and "D200" for the sub-project data 33-1 and 33-2 and the derived sub-project data 33A-1 and 33A-2. The literal of "font" is "outline" for the master data 31, "16-dot standard" for the sub-project data 33-1, and a reference value for each of the sub-project data 33-2 and the derived sub-project data 33A-1 and 33A-2. The literal of "character string" is "abc" for the master data 31, "def" for the sub-project data 33-1 and 33-2, and "ghi" for the derived sub-project data 33A-1 and 33A-2. In this case, because the common literal "D200" is included in "device" of all the sub-project data 33-1 and 33-2 which refer to the master data 31 and the derived sub-project data 33A-1 and 33A-2, the literal in the master data 31 is preferably "D200" considering the data structure of the entire project data 30. As illustrated in a portion in FIG. 13 regarding after data organization, the data organizing unit 15 replaces the literal in the master data 31 with the common literal "D200", and replaces the literals of "device" of the sub-project data 33-1 and 33-2 and the derived sub-project data 33A-1 and 33A-2 with reference data.

Figure 14:
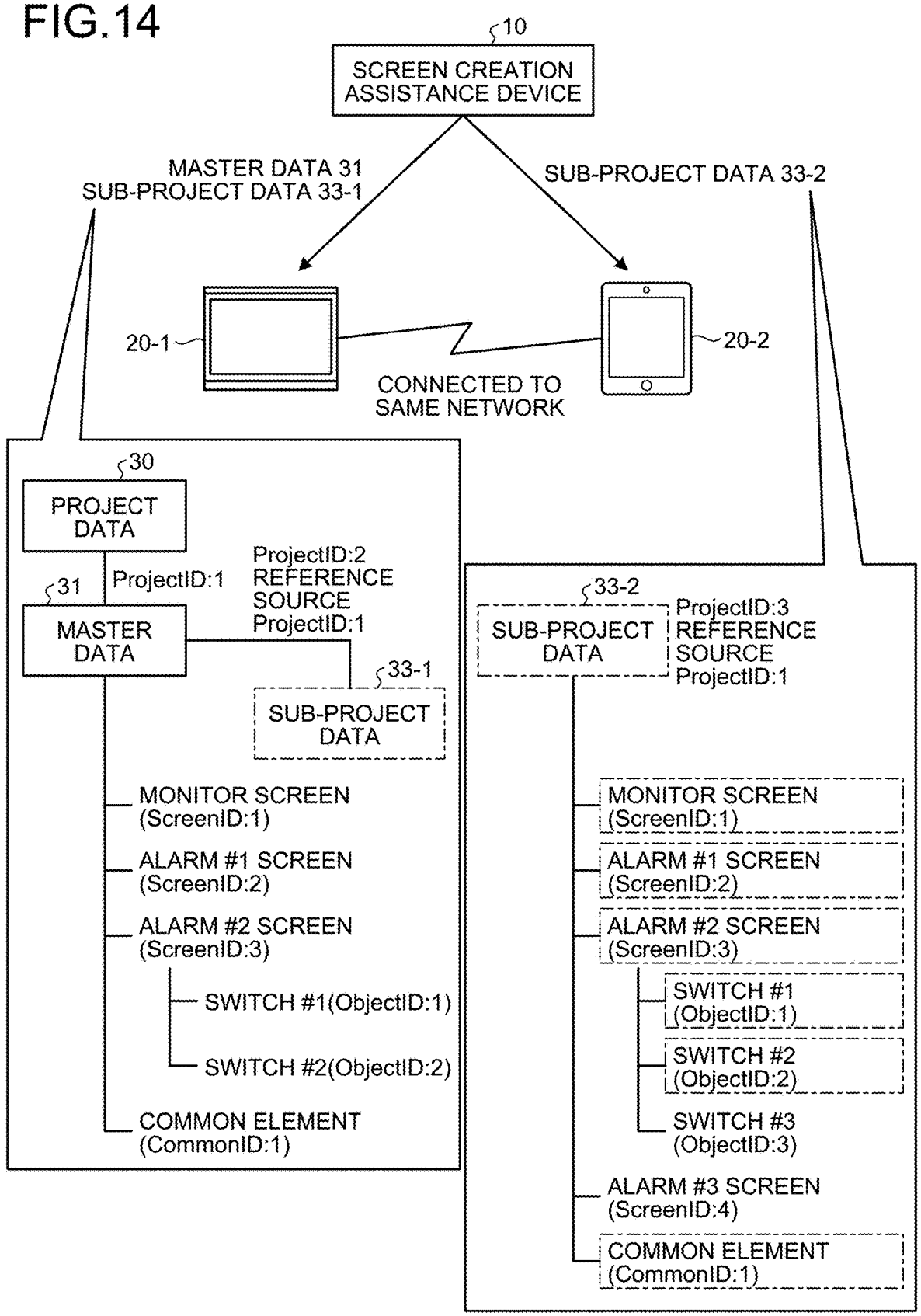
FIG. 14 is an explanatory diagram of an example operation in a case where the display device illustrated in FIG. 4 does not store master data.

FIG. 14 is an explanatory diagram of an example operation in a case where the display device 20 illustrated in FIG. 4 does not store the master data 31. The communication unit 14 of the screen creation assistance device 10 can transmit, to the display device 20-1 out of the plurality of display devices 20-1 and 20-2 connected to the same network, the project data 30 including the master data 31 and the sub-project data 33-1, and can transmit, to the display device 20-2, only the sub-project data 33-2 without transmitting the master data 31. Both the sub-project data 33-1 and 33-2 refer to the same master data 31. In this case, the display device 20-2 can generate a screen displayed by the display device 20-2 by referring to the master data 31 stored in another display device 20-1 connected to the same network. Although the operation of the display device 20-2 which receives the sub-project data 33-2 referring to the master data 31 has been described here, regarding each display device 20 which receives the derived sub-project data 33A referring to the sub-project data 33, it is similarly possible to refer to the master data 31 stored in another display device 20 which receives the sub-project data 33 as a reference source.

Figure 15:
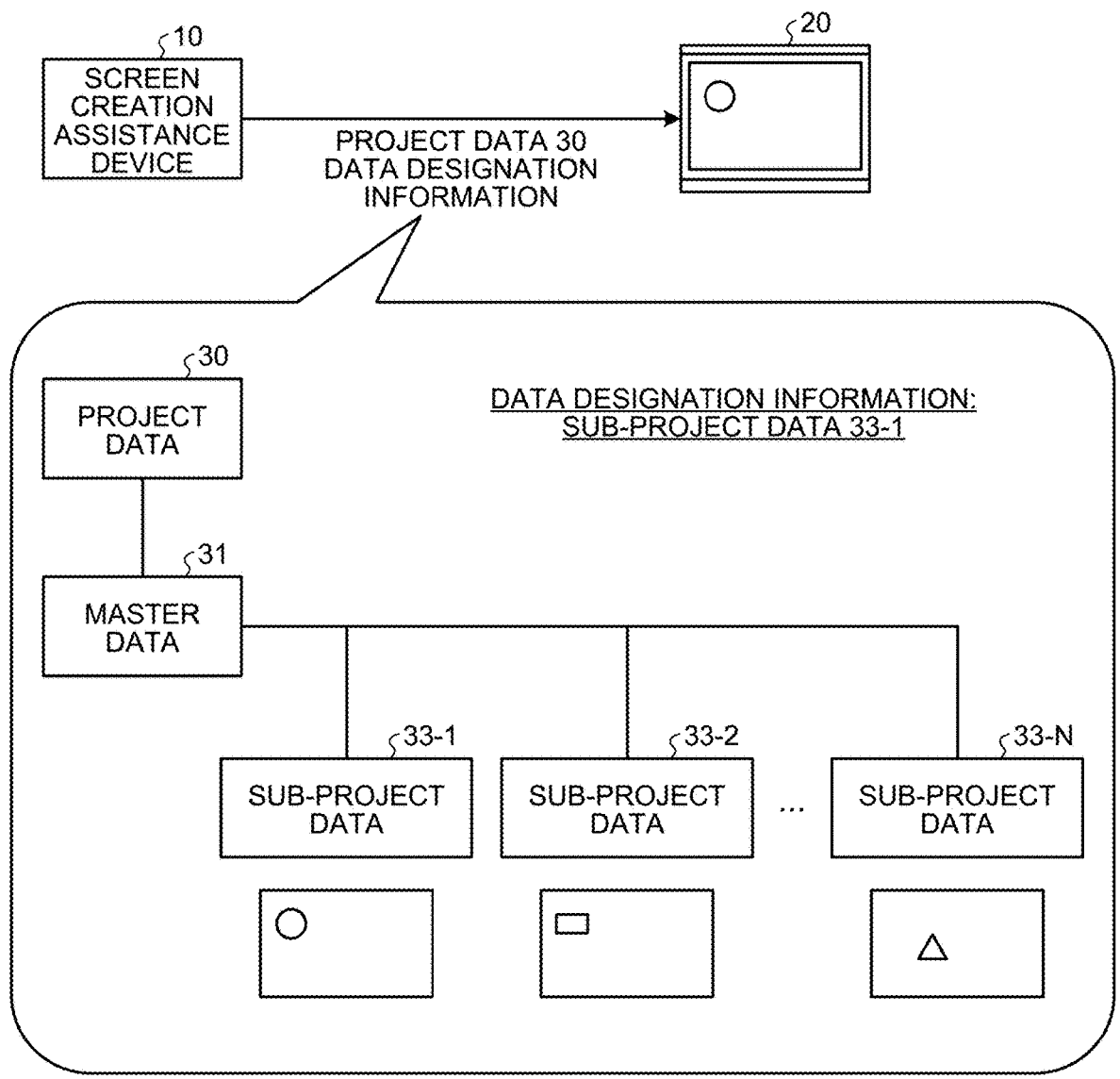
FIG. 15 is an explanatory diagram of an operation when the display device illustrated in FIG. 4 receives a plurality of sub-project data.

FIG. 15 is an explanatory diagram of an operation when the display device 20 illustrated in FIG. 4 receives a plurality of sub-project data 33. In a case of transmitting the project data 30 including a plurality of sub-project data 33-1 to 33-N to the display device 20, the screen creation assistance device 10 can transmit, along with the project data 30, data designation information that designates the sub-project data 33 used by the display device 20 that is the transmission destination for displaying a screen. In the example of FIG. 15, the project data 30 includes the sub-project data 33-1 to 33-N, and the data designation information indicates the sub-project data 33-1. In this case, the display device 20 can display the screen by using the designated sub-project data 33-1 among the plurality of sub-project data 33-1 to 33-N. In the example illustrated in FIG. 15, the screen creation assistance device 10 transmits the data designation information, but it is also possible for the display device 20 to generate a screen to be displayed by selecting one of the plurality of sub-project data 33-1 to 33-N.

Regarding exemplar uses of the plurality of sub-project data 33 transmitted by the screen creation assistance device 10 to one display device 20, the following cases and the like are possible: a case of transmitting the sub-project data 33 for debugging to the display device 20 together with the sub-project data 33 for normal display; and a case of transmitting a plurality of sub-project data 33 for displaying a plurality of screens for different uses to the display device 20.

Figure 16:
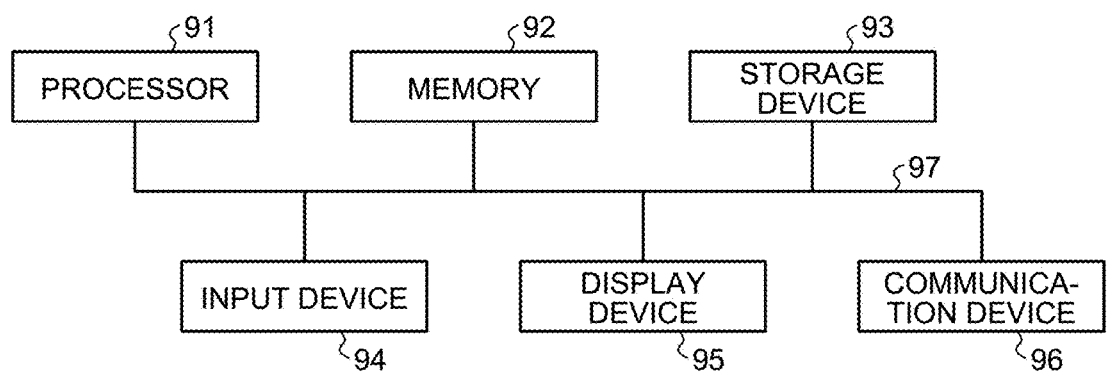
FIG. 16 is a diagram illustrating an example of a hardware configuration for realizing functions of the screen creation assistance device illustrated in FIG. 3 and the display device.

FIG. 16 is a diagram illustrating an example of a hardware configuration for realizing functions of the screen creation assistance device 10 illustrated in FIG. 3 and the display device 20. Each of the functional units illustrated in FIGS. 3 and 4 includes a processor 91, a memory 92 used by the processor 91 for a work area, a storage device 93 which stores a computer program in which each of functions of the screen creation assistance device 10 and the display device 20 is described, an input device 94 which is an input interface with a worker, a display device 95 which is an output device displaying information to the worker, and a communication device 96 which has a communication function. The processor 91, the memory 92, the storage device 93, the input device 94, the display device 95, and the communication device 96 are connected by a data bus 97.

The processor 91 is a processing device, an arithmetic device, a microprocessor, a microcomputer, a central processing unit (CPU), a digital signal processor (DSP) or the like.

The memory 92 and the storage device 93 are each a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, a digital versatile disc (DVD), or the like.

The input device 94 is a pointing device such as a mouse or a touch pad, a keyboard, or the like. The display device 95 is a liquid crystal display, an organic electro luminescence (EL) display, or the like.

Each of the functions of the screen creation assistance device 10 and the display device 20 can be realized, for example, by the processor 91 reading and executing a computer program stored in the memory 92 illustrated in FIG. 16. A plurality of processors 91 and a plurality of memories 92 may cooperate to realize the above functions. Furthermore, a part of the functions of the screen creation assistance device 10 and the display device 20 may be implemented as an electronic circuit, and another part may be realized by using the processor 91 and the memory 92.

Next, an operation of the screen creation assistance device 10 will be described. An editing operation of the sub-project data 33 of the screen creation assistance device 10 and an operation of the data organizing unit 15 of the screen creation assistance device 10 will be described below.

Figure 17:
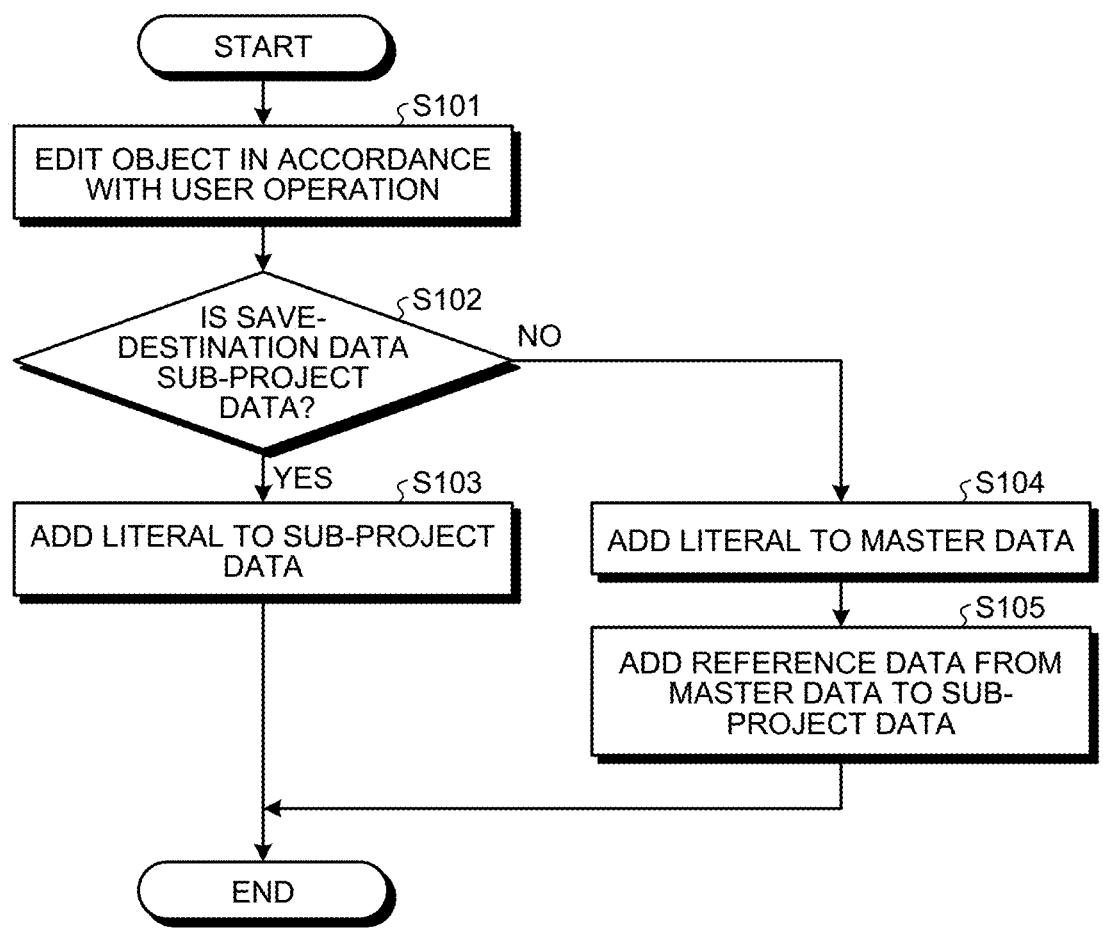
FIG. 17 is a flowchart illustrating an operation in which the screen creation assistance device illustrated in FIG. 3 edits the sub-project data.

FIG. 17 is a flowchart illustrating an operation in which the screen creation assistance device 10 illustrated in FIG. 3 edits the sub-project data 33. When the sub-project data creation unit 12 of the screen creation assistance device 10 displays an edit screen for the sub-project data 33 and receives a user operation, the sub-project data creation unit 12 edits an object included in the sub-project data 33 in accordance with the user operation (step S101).

Subsequently, the sub-project data creation unit 12 displays the destination-data selection screen 42 illustrated in FIG. 7, then receives a user operation, and determines whether a save-destination data is the sub-project data 33 in accordance with the user operation (step S102).

If the save-destination data is the sub-project data 33 (step S102: Yes), the sub-project data creation unit 12 adds the literal of the object to the sub-project data 33 which is under edition (step S103). If the save-destination data is not the sub-project data 33 but the master data 31 (step S102: No), the sub-project data creation unit 12 adds the literal of the object to the master data 31 (step S104). The sub-project data creation unit 12 further adds reference data from the master data 31 to the sub-project data 33 (step S105).

Figure 18:
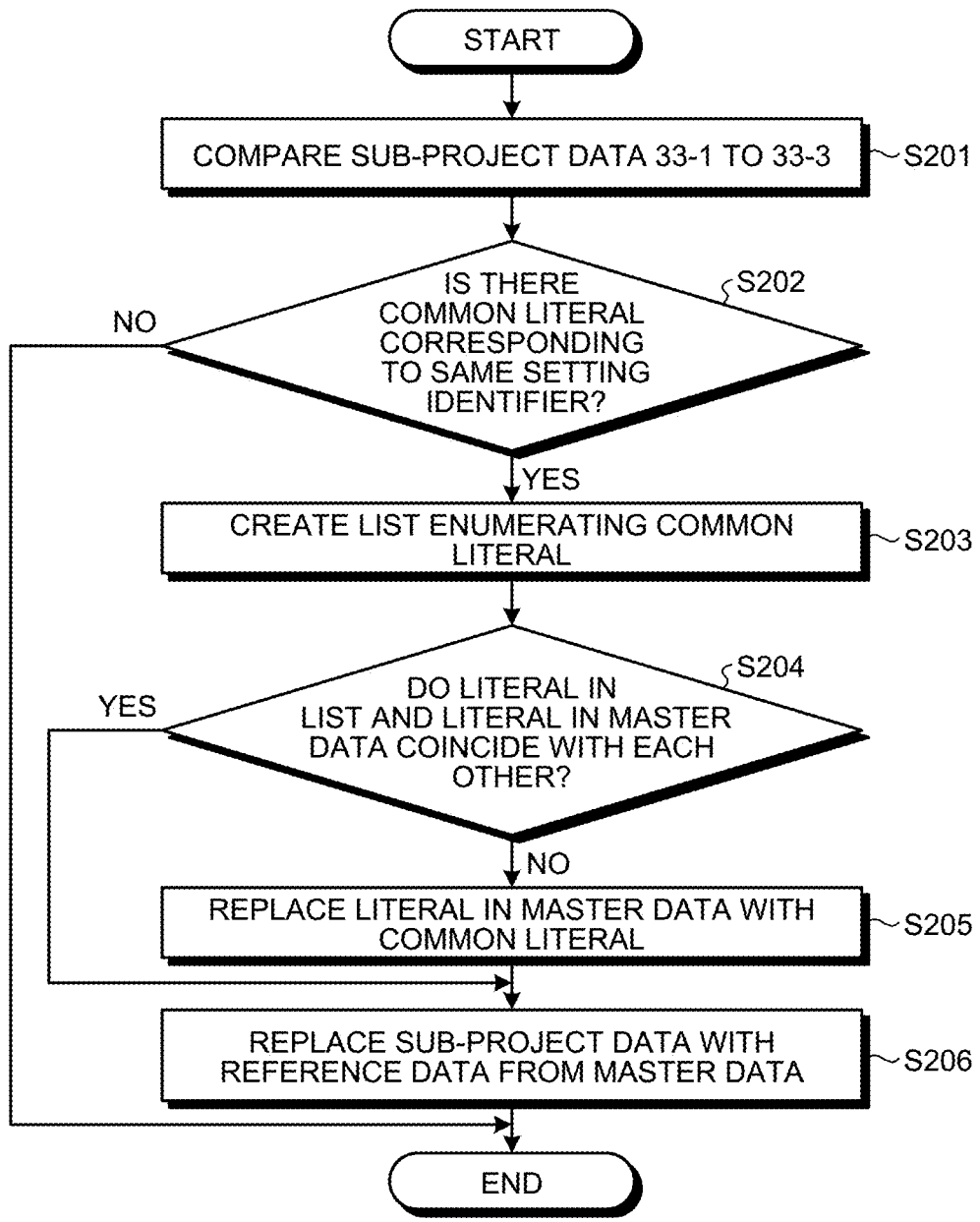
FIG. 18 is a flowchart illustrating an example operation of a data organizing unit illustrated in FIG. 3 when a literal common to the plurality of sub-project data referring to the master data is included.

FIG. 18 is a flowchart illustrating an example operation of the data organizing unit 15 illustrated in FIG. 3 when a literal common to the plurality of sub-project data 33 referring to the master data 31 is included. The data organizing unit 15 compares the plurality of sub-project data 33-1 to 33-3 included in the project data 30 stored in the storage unit 13 with each other (step S201).

The data organizing unit 15 determines, as a result of the comparison, whether there is a common literal corresponding to the same setting identifier (step S202). Here, in a case where the literal corresponding to the same setting identifier coincide with each other regarding all of the sub-project data 33-1 to 33-3, the data organizing unit 15 determines that there is a common literal.

If there is a common literal (step S202: Yes), the data organizing unit 15 creates a list enumerating the common literal (step S203). For example, in the example illustrated in FIG. 11, "D200" for device of ObjectID:1 of the screen #1 is the common literal.

The data organizing unit 15 determines whether the literal in the list created in step S203 and the literal in the master data 31 coincide with each other (step S204). If the literals do not coincide with each other (step S204: No), the data organizing unit 15 replaces the literal in the master data 31 with the common literal (step S205). If the literals coincide with each other (step S204: Yes), the process of step S205 is skipped. The data organizing unit 15 replaces the sub-project data 33 regarding the corresponding setting identifier with the reference data from the master data 31 (step S206).

If there is no common literal (step S202: No), the data organizing unit 15 skips the processes of steps S203 to S206. The operation illustrated in FIG. 18 is an example, and various changes can be made without departing from the gist of the present invention. For example, in the example illustrated in FIG. 18, the comparison of the plurality of sub-project data 33-1 to 33-3 is performed to create the list, but the data organizing unit 15 may compare the sub-project data 33 two by two. In this case, the data organizing unit 15 may create a list #1 indicating a result of comparison between the sub-project data 33-1 and the sub-project data 33-2, and may create a list #2 indicating a result of comparison between the list #1 and the sub-project data 33-3. In this case, the data organizing unit 15 compares the list #2 with the master data 31.

Figure 19:
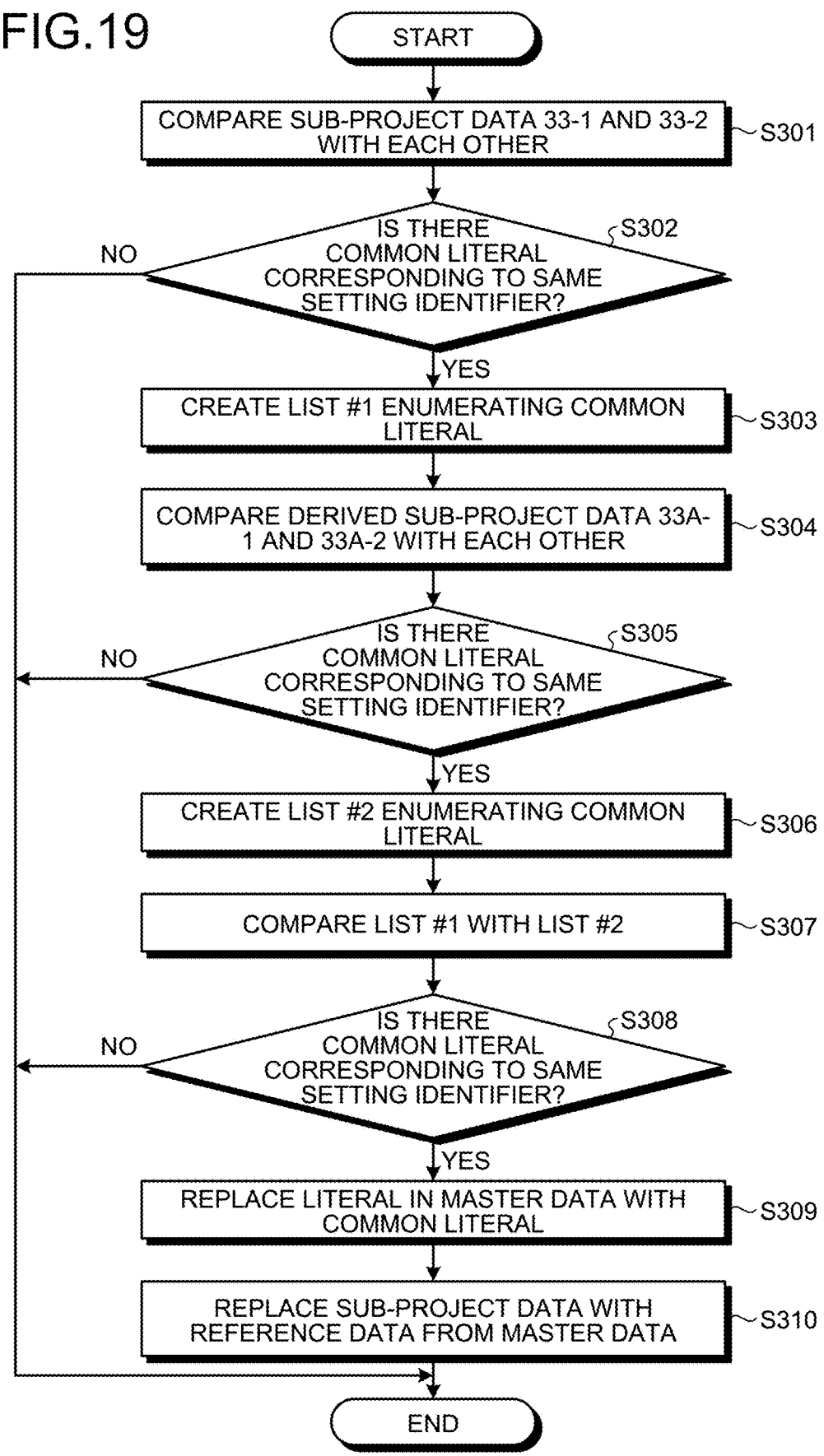
FIG. 19 is a flowchart illustrating an example operation of the data organizing unit illustrated in FIG. 3 when the project data includes a plurality of derived sub-project data.

FIG. 19 is a flowchart illustrating an example operation of the data organizing unit 15 illustrated in FIG. 3 when the project data 30 includes a plurality of derived sub-project data 33A. The data organizing unit 15 compares the sub-project data 33-1 and 33-2 with each other (step S301). The data organizing unit 15 determines whether there is a common literal corresponding to the same setting identifier (step S302).

If there is a common literal (step S302: Yes), the data organizing unit 15 creates a list #1 enumerating the common literal (step S303). Subsequently, the data organizing unit 15 compares the derived sub-project data 33A-1 and 33A-2 with each other (step S304). The data organizing unit 15 determines whether there is a common literal corresponding to the same setting identifier in the derived sub-project data 33A-1 and 33A-2 (step S305).

If there is a common literal (step S305: Yes), the data organizing unit 15 creates a list #2 enumerating the common literal (step S306). Then, the data organizing unit 15 compares the list #1 with the list #2 (step S307). The data organizing unit 15 determines whether there is a common literal corresponding to the same setting identifier in the list #1 and the list #2 (step S308).

If there is a common literal (step S308: Yes), the data organizing unit 15 replaces the literal of the master data 31 with the common literal (step S309). The data organizing unit 15 replaces the sub-project data 33 with the reference data from the master data 31 (step S310). If there is no common literal in the sub-project data 33-1 and 33-2 (step S302: No), the data organizing unit 15 skips the processes of steps S303 to S310. If there is no common literal in the derived sub-project data 33A-1 and 33A-2 (step S305: No), the data organizing unit 15 skips the processes of steps S306 to S310. If there is no common literal in the list #1 and the list #2 (step S308: No), the data organizing unit 15 skips the processes of step S309 and step S310.

The operations illustrated in FIGS. 18 and 19 may be executed when the user performs an operation of instructing execution, or may be executed when the screen creation assistance device 10 is activated.

As described above, the screen creation assistance device 10 according to the first embodiment of the present invention creates the master data 31 including setting identifiers each set for one of elements included in the screen creation data and literals corresponding to the setting identifiers, creates the sub-project data 33 including reference data for referring to the master data 31, setting identifiers which are not included in the master data 31, and literals corresponding to the setting identifiers which are not included in the master data 31, and transmits the master data 31 and the sub-project data 33 to the display device 20. In a case of diverting the project data 30, it is possible to create the sub-project data 33 which refers to the master data 31, and to uniquely include setting identifiers and literals corresponding to the setting identifiers in the sub-project data 33 with respect only to a difference from the master data 31. At that time, the user only needs to edit the sub-project data 33 to be created and does not need to open other data, and therefore, the project data for causing the display device 20 to display a screen can be easily diverted.

Furthermore, in a case where a literal which is not included in the master data 31 is input when the sub-project data creation unit 12 creates the sub-project data 33, the sub-project data creation unit 12 causes a save-destination data of the input literal to be selected from the master data 31 and the sub-project data 33. Therefore, even if the user wishes to reflect the content of editing in the entire project data 30, the user does not need to open other data such as the master data 31, and can perform work from the edit screen for the sub-project data 33. Accordingly, the project data is more easily edited.

The sub-project data creation unit 12 can create not only the sub-project data 33 which refers to the master data 31, but also the derived sub-project data 33A which refers to the sub-project data 33 and the derived sub-project data 33A which refers to the derived sub-project data 33A. With such a hierarchical data structure, the user only needs to edit a difference from the reference source data, so that the project data can be easily diverted.

Furthermore, the screen creation assistance device 10 according to the first embodiment includes the data organizing unit 15. The user does not always edit the project data 30 in consideration of the data structure of the entire project data 30. Therefore, there may be a case where a literal corresponding to a setting identifier is set to the same value as that of the master data 31, or a case where as a result of editing by the user, a literal in the master data 31 is not referred to by any sub-project data 33. However, a literal included in the master data 31 is preferably a value used by a largest number of sub-project data 33 among the sub-project data 33 included in the project data 30, and preferably there are many sub-project data 33 which include the reference data from the master data 31. Therefore, the data organizing unit 15 checks the data structure of the created project data 30 and optimizes the data structure. Accordingly, the data structure of the project data 30 created by the screen creation assistance device 10 can be simplified to facilitate data management.

Furthermore, in the first embodiment, in a case where the display device 20 does not store the master data 31, the display device 20 can refer to the master data 31 stored by another display device 20. With such a configuration, the screen creation assistance device 10 is only required to transmit the master data 31 to at least one of the plurality of display devices 20 connected to the same network. Even when the master data 31 is updated, the number of master data 31 to be updated is reduced, which facilitates data management.

The configurations described in the embodiment above are merely examples of the content of the present invention and can be combined with other known technology and part thereof can be omitted or modified without departing from the gist of the present invention.

Although the functions of the screen creation assistance device 10 and the display device 20 have been described above, the technology described in the first embodiment can also be realized, for example, as a computer program, a recording medium with the computer program recorded thereon, a screen creation assistance method, and a display method for realizing each of the functions of the screen creation assistance device 10 and the display device 20.

REFERENCE SIGNS LIST 1 screen creation assistance system; 10 screen creation assistance device; 11 master data creation unit; 12 sub-project data creation unit; 13, 23 storage unit; 14, 21 communication unit; 15 data organizing unit; 20, 20-1, 20-2, 20-3 display device; 22 display unit; 30 project data; 31 master data; 32 sub-project data group; 33, 33-1, 33-2, 33-3, 33-N sub-project data; 33A, 33A-1, 33A-2 derived sub-project data; 41 reference source selection screen; 42 destination-data selection screen; 43 destination reference change screen; 91 processor; 92 memory; 93 storage device; 94 input device; 95 display device; 96 communication device; 97 data bus.

The invention claimed is:

1. A screen creation assistance device comprising:
a first processor; and
a first memory to store a first program which, when executed by the first processor, performs processes of:
creating master data including pieces of first specific information, each first specific information including a first setting identifier that identifies a first element of a plurality of first elements included in screen creation data for causing a display device to display a screen, and a literal value of the first element identified by the first setting identifier;
creating sub-project data including reference data and second specific information, wherein the reference data is data for referring to the first setting identifier in the master data to use the corresponding literal values included in the master data without including the literal values for the first elements in the sub-project data, each second specific information includes a second setting identifier for identifying a second element that is included in the screen creation data for causing the display device to display the screen and is not included in the master data, and a literal value of a corresponding second element identified by the second setting identifier; and transmitting the master data and the sub-project data to one of a plurality of the display devices in a same network, and transmitting, to another display device of the plurality of the display devices, the sub-project data without transmitting the master data.

2. The screen creation assistance device according to claim 1, wherein in a case where the second specific information that is not included in the master data is input when the first processor creates the sub-project data, the first processor causes a save-destination data of the input second specific information to be selected from the master data and the sub-project data.

3. The screen creation assistance device according to claim 2, wherein in a case where the master data is selected as the save-destination data, the first processor stores the input second specific information in the master data, and the first processor creates sub-project data including reference data from the input second specific information.

4. The screen creation assistance device according to claim 2, wherein in a case where the sub-project data is selected as the save-destination data, the first processor creates sub-project data including the input second specific information.

5. The screen creation assistance device according to claim 1, wherein
the first specific information includes setting identifiers for identifying the first elements,
each of the master data and the sub-project data further includes labels that are any character strings associated with the setting identifiers, and
the first processor is capable of associating a character string, which is same as a label included in the master data with the setting identifier that is different from that of the master data.

6. The screen creation assistance device according to claim 1, wherein the first processor is capable of creating derived sub-project data that is sub-project data that refers to the sub-project data, and the derived sub-project data includes reference data from the sub-project data that is a reference source.

7. The screen creation assistance device according to claim 6, wherein the first processor is capable of creating derived sub-project data that refers to the derived sub-project data.

8. The screen creation assistance device according to claim 6, wherein
the first specific information includes setting identifiers for identifying the first elements and literals that are values of the first elements used by the display device for operation, and
first processor further performs,
on a basis of a common literal included in a plurality of the derived sub-project data that refers to same sub-project data, editing one or more literals of at least one of the master data and the sub-project data.

9. The screen creation assistance device according to claim 8, wherein in a case where the common literal is common to literals in all the sub-project data that refer to the master data, the first processor replaces a literal in the master data with the common literal, and replaces the literals in a plurality of the sub-project data and the derived sub-project data with reference data.

10. The screen creation assistance device according to claim 1, wherein
the first specific information includes setting identifiers for identifying the first elements and literals that are values of the first elements used by the display device for operation, and
the first processor further
replaces a literal in the master data with a common literal included in a plurality of the sub-project data, and replaces literals in the plurality of the sub-project data with reference data.

11. The screen creation assistance device according to claim 1, wherein the first processor transmits the master data and a plurality of the sub-project data to the display device, and designates, among the plurality of the sub-project data, the sub-project data used by the display device that is a transmission destination.

12. The screen creation assistance device according to claim 1, wherein one master data and one or more sub-project data are associated with each other to have a hierarchical data structure.

13. A display device that displays a screen by using screen creation data, the device comprising:
a second processor; and
a second memory to store a second program which, when executed by the second processor, performs processes of:
receiving sub-project data that includes reference data and second specific information, wherein the reference data is data for referring to first setting identifiers in master data to use corresponding literal values included in the master data,
the master data including pieces of first specific information, each first setting information including a first setting identifier that identifies a first element of a plurality of first elements included in screen creation data for causing a display device to display a screen, and a literal value of the first element identified by the first setting identifier, each second setting identifier in the sub-project identifies a second element that is included in the screen creation data for causing the display device to display the screen and is not included in the master data, and the sub-project data excluding the literal values for all the first elements; and
displaying a screen by using screen creation data based on the sub-project data, wherein
in a case where the master data is not stored, the second processor displays the screen by referring to the master data stored in another display device connected to a same network.

14. The display device according to claim 13, wherein
the second processor receives a plurality of sub-project data and information that designates one of the plurality of sub-project data, and
the second processor displays the screen by using screen creation data based on the sub-project data that has been designated.

15. The display device according to claim 13, wherein one master data and one or more sub-project data are associated with each other to have a hierarchical data structure.

16. A non-transitory computer readable storage medium that stores a computer program that causes a computer to:

create master data including pieces of first specific information. each first specific information including first setting identifier that identifies a first element in screen creation data for causing a display device to display a screen, and a literal value of the first element identified by the first setting identifier;

create sub-project data including reference data and second specific information, wherein the reference data is data for referring to the first setting identifiers in the master data to use the corresponding literal values included in the master data without including literal values for the first elements in the sub-project data, each second specific information including setting identifier for identifying a second element that is included in the screen creation data for causing the display device to display the screen and is not included in the master data, and a literal value of a corresponding second element identified by the second setting identifier; and transmit the master data and the sub-project data to one of a plurality of the display devices in a same network, and transmit, to another display device of the plurality of the display devices, the sub-project data without transmitting the master data.

17. The non-transitory computer readable storage medium according to claim 16, wherein one master data and one or more sub-project data are associated with each other to have a hierarchical data structure.

18. A screen creation assistance system comprising:
a screen creation assistance device including
   a first processor, and
   a first memory to store a first program which, when executed by the first processor, performs processes of
      creating master data including pieces of first specific information, each first specific information including a first setting identifier that identifies a first element of a plurality of first elements included in screen creation data for causing a display device to display a screen, and a literal value of the first element identified by the first setting identifier,
      creating sub-project data including reference data and second specific information, wherein the reference data is data for referring to the first setting identifier in the master data to use the corresponding literal values included in the master data without including the literal values for the first elements in the sub-project data, each second specific information includes a second setting identifier for identifying a second element that is included in the screen creation data for causing the display device to display the screen and is not included in the master data, and a literal value of a corresponding second element identified by the second setting identifier, and
      transmitting the master data and the sub-project data to one of a plurality of the display devices in a same network, and transmitting, to another display device of the plurality of the display devices, the sub-project data without transmitting the master data; and
the plurality of the display devices connected with the screen creation assistance device in the same network, wherein
the screen creation assistance device transmits the master data and the sub-project data to a first display device out of the display devices, and transmits the sub-project data without transmitting the master data to a second display device that is different from the fist display device out of the display devices, and
when the second display device generates a screen to be displayed by the second display device, the second display device refers to the master data stored in the first display device.

* * * * *